(12) United States Patent
Herrod et al.

(10) Patent No.: US 7,216,238 B2
(45) Date of Patent: May 8, 2007

(54) SYSTEM AND METHOD FOR CONTROLLING USAGE OF SOFTWARE ON COMPUTING DEVICES

(75) Inventors: Allan Herrod, Mission Viejo, CA (US); Alan J. Epshteyn, Dix Hills, NY (US); Robert J. Schreib, Shoreham, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 789 days.

(21) Appl. No.: 10/609,956

(22) Filed: Jun. 30, 2003

(65) Prior Publication Data
US 2005/0005134 A1 Jan. 6, 2005

(51) Int. Cl.
*H04L 9/00* (2006.01)
(52) U.S. Cl. ............... 713/185; 713/182; 713/168
(58) Field of Classification Search ............ 713/185, 713/182, 168
See application file for complete search history.

(56) References Cited

OTHER PUBLICATIONS http://www.verisign.com/products-services/security-services/pki/index.html.*

An authentication technique based on distributed security management for the global mobility network Suzuki, S.; Nakada, K.; Selected Areas in Communications, IEEE Journal on vol. 15, Issue 8, Oct. 1997 pp. 1608-1617.*
An improved authenticated key agreement protocol with perfect forward secrecy for wireless mobile communication Ai-fen Sui; Hui, L.C.K.; Yiu, S.M.; Chow, K.P.; Tsang, W.W.; Chong, C.F.; Pun, K.H.; Chan, H.W.; Wireless Communications and Networking Conference, 2005 IEEE vol. 4, Mar. 13-17, 2005 pp. 2088-2093 vol. 4.*

* cited by examiner

*Primary Examiner*—David Jung
(74) *Attorney, Agent, or Firm*—Fay Kaplun & Marcin, LLP

(57) ABSTRACT

Described is a method and system for controlling usage of software on a computing device. An authorization key is generated as a function of a device string and a software string. The device string is a unique string stored in the device. The software string is a unique string stored in a software authorized for use on the device. The authorization key is encrypted using a private key and stored in the device. Upon a request to use software on the device, the authorization key is decrypted using a public key corresponding to the private key. A test key is generated as a function of the device string and a request software string. The request software string is a unique string stored in the software for which use has been requested. The authorization key is compared to the test key. When the test key matches the authorization key, usage of the software for which use has been requested on the device is permitted.

16 Claims, 5 Drawing Sheets

SYSTEM AND METHOD FOR CONTROLLING USAGE OF SOFTWARE ON COMPUTING DEVICES

BACKGROUND

Conventional computing devices utilize a wide variety of software packages in their everyday operations. Although presently, software distribution is primarily regulated through licensing, access codes, CD-keys, etc., such security precautions are susceptible to manipulation by unauthorized third parties. Therefore, there is a need for more secure means of authorizing software usage on particular computing devices.

SUMMARY OF THE INVENTION

The present invention relates to a method and system for controlling usage of software on a computing device. An authorization key is generated as a function of a device string and a software string. The device string is a unique string stored in the device. The software string is a unique string stored in a software authorized for use on the device. The authorization key is encrypted using a private key and stored in the device.

Upon a request to use software on the device, the authorization key is decrypted using a public key corresponding to the private key. A test key is generated as a function of the device string and a request software string. The request software string is a unique string stored in the software for which use has been requested. The authorization key is compared to the test key. When the test key matches the authorization key, usage of the software for which use has been requested on the device is permitted.

BRIEF DESCRIPTION OF THE DRAWINGS

The accompanying drawings are included to provide a further understanding of the invention and are incorporated in and constitute part of the specification, illustrate several embodiments of the invention and, together with the description, serve to explain examples of the present invention. In the drawings.

DETAILED DESCRIPTION

Figure 1:
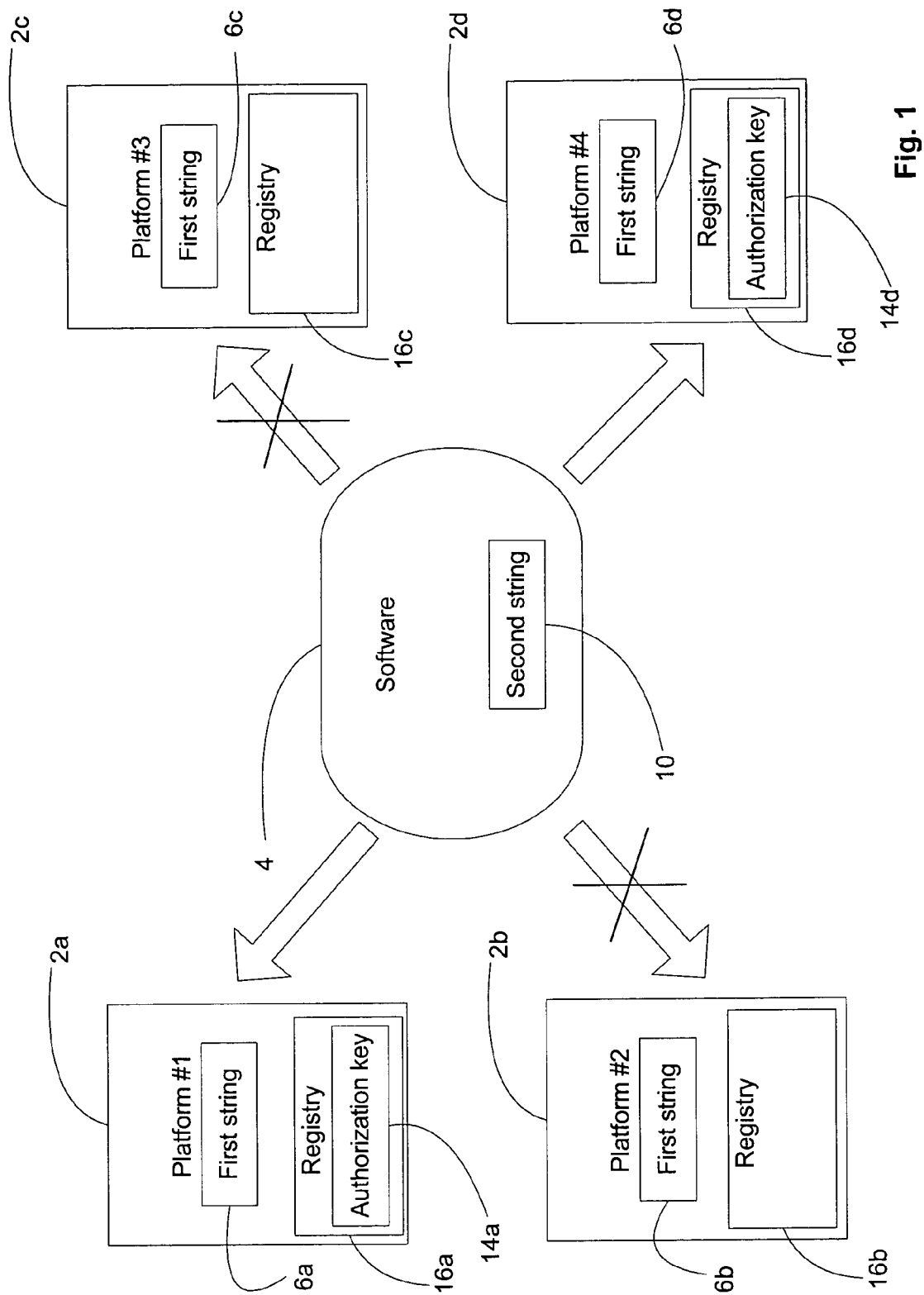
FIG. 1 shows an exemplary system according to the present invention for controlling usage of a software.

FIG. 1 shows an exemplary system for controlling usage of software on computing devices where the use of a software 4 is allowed only particular platforms 2a and 2d. The platforms 2a–2d may be any computing devices (e.g., PCs, handheld devices, PDAs, etc.) which may operate on one of a plurality of operating systems, (e.g., Windows, Unix, Apple OS, etc.). The software 4 may be any program/code (e.g., office suite, image recognition software, etc.) which a hardware/software manufacturer desires to restrict the use thereof.

The restriction of software 4 to particular platforms 2a and 2d may be accomplished by creating and storing the authorization keys 14a and 14d for the software in the registries 16a and 16d of the corresponding platforms. Each of the registries 16a–16d is a digital storage area of a computing device (e.g., ROM, hard drive, etc.) that may contain information about the particular platforms 2a–2d (e.g., build date, manufacturer, etc.).

Figure 2:
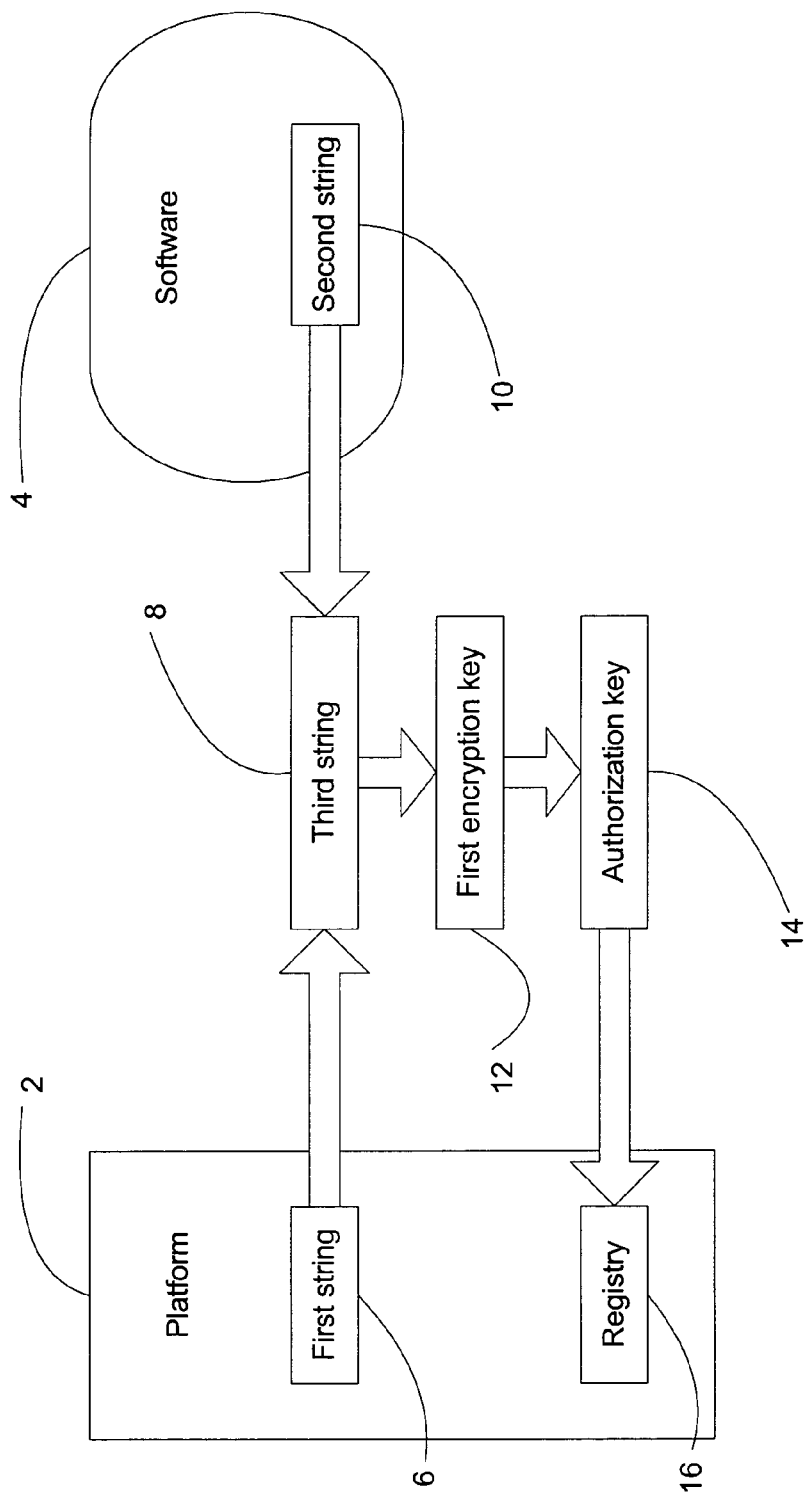
FIG. 2 shows an exemplary system according to the present invention for creating and storing a software authorization key.
Figure 4:
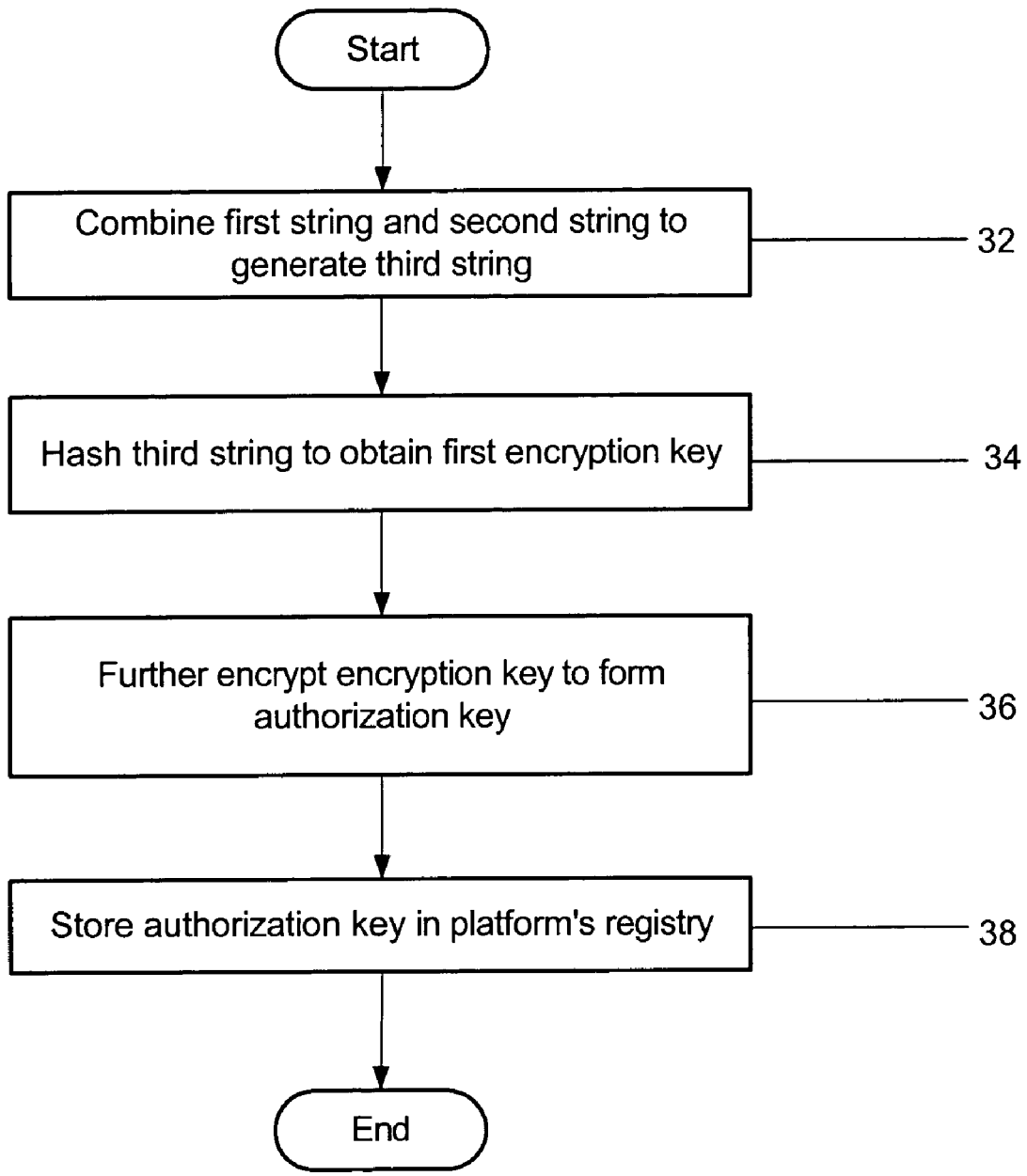
FIG. 4 shows an exemplary embodiment of a method for creating and storing a software authorization key according to the present invention.

As described in detail below, the authorization keys 14a and 14d may be created using the first string 6a and 6d stored in the platforms 2a and 2d respectively, in conjunction with the second string 10 stored in the software 4 as shown in FIGS. 2 and 4, so that only platforms 2a and 2d may utilize the software 4. The first strings 6a and 6d and the second string 10 are unique and specific to the platforms 2a and 2d and the software 4 respectively. The first strings 6a–6d may be created and stored by the manufacturer in the platforms 2a–2d during the production process. The second string 10 may likewise be created and stored in the software 4. The platform string 6 may be formed by combining sub-strings present on the platform 2, such as a combination of an original equipment manufacturer ("OEM") string and a product-name string. The first strings 6a and 6d and the second string 10 may not be modified by the subsequent user after the manufacturing process. The unique nature of the first strings 6a and 6d and the second string 10 and the lack of available modification means makes them suited for identification and authorization purposes of the platforms 2a and 2d and the software 4.

As shown in FIG. 1, only the platforms 2a and 2d are allowed to run the software 4 because they are the only ones that have the proper authorization keys 14a and 14d. The authorization keys 14a and 14d are created using the second string 10 and the first string 6a and 6d stored in the platforms 2a and 2d respectively. Since the platforms 2a and 2d are used in creating the authorization keys 14a and 14d these are the only platforms capable of running the software 4. Conversely, the platforms 2b and 2c lack the required authorization keys. Therefore, these platforms 2b and 2c are not able to utilize the software 4.

FIG. 2 shows the generation of the authorization key 14 using the first string 6 and the second string 10 stored in the platform 2 and the software 4, respectively. As stated above, the first string 6 and the second string 10 are specific and unique to their locations (i.e., the platform 2 and the software 4).

FIG. 4 shows a method for creating the authorization key 14 which may be subsequently used by the platform 2 to determine if it is allowed to utilize the software 4. In step 32, the first string 6 and the second string 10 are utilized to generate a third string 8. The third string 8, for example, may be formed by combining or concatenating the first string 6 and the second string 10. This step is important to the creation of the unique authorization key 14. Since the first string 6 is unique to the platform 2 and the second string is unique to the software 4, the resulting third string 8 is specific only to a combination of the platform 2 and the software 4 that are used in creating the third string 8.

In step 34, the third string 8 may be hashed in order to form a first encryption key 12. In particular, a conventional hashing algorithm may be used to produce a hash value of the third string 8. A person skilled in the art will understand that any one of a plurality of hashing algorithms (e.g., MD2, MD4, MD5, and SHA-1, etc.) may be used for such purpose.

A hashing algorithm is part of a hashing function which transforms a set of data (i.e., the third string 8) into another form that is more suitable for computing processes (i.e., the encryption key 12). Hashing of the third string 8 may also provide another level of security because the hashed data cannot be utilized unless it can be hashed in reverse to obtain the original data (i.e., the third string 8).

In step 36, after the third string 8 is hashed, the resulting first encryption key 12 is encrypted to form an authorization key 14 using one of a plurality of encryption schemes. The first encryption key 12, for example, may be encrypted using the private key of a private/public key pair. The private/public key pair algorithm is similar to a conventional PGP system where the private key is used to encrypt messages (e.g., email) and a public key is used to decrypt the previously encrypted messages. The PGP system may operate in the following manner: a creator of the message possesses one half of the private/public key pair, which is used to encrypt messages and the other half is distributed to parties who need to decrypt the messages sent to them by the creator. In the present invention, the private/public key pair may be used in a substantially similar manner as that in the PGP system: the encryption key 12 is exported to a binary large object ("blob") where it is encrypted using the private key. The blob is a generic sequence of bits that contain one or more fixed-length header structures plus context specific data. This blob may be then stored in the registry 16 as the authorization key 14.

In step 38, the authorization key 14 is stored in a registry 16 of the platform 2. For example, the authorization key 14 may be in the form of the blob which can be exported to a file and copied to any number of computing devices of the platform 2. As a result, all the computing devices of the platform 2 could be capable of operating software 4 which greatly reduces the difficulties of mass-producing the authorization key 14.

Figure 3:
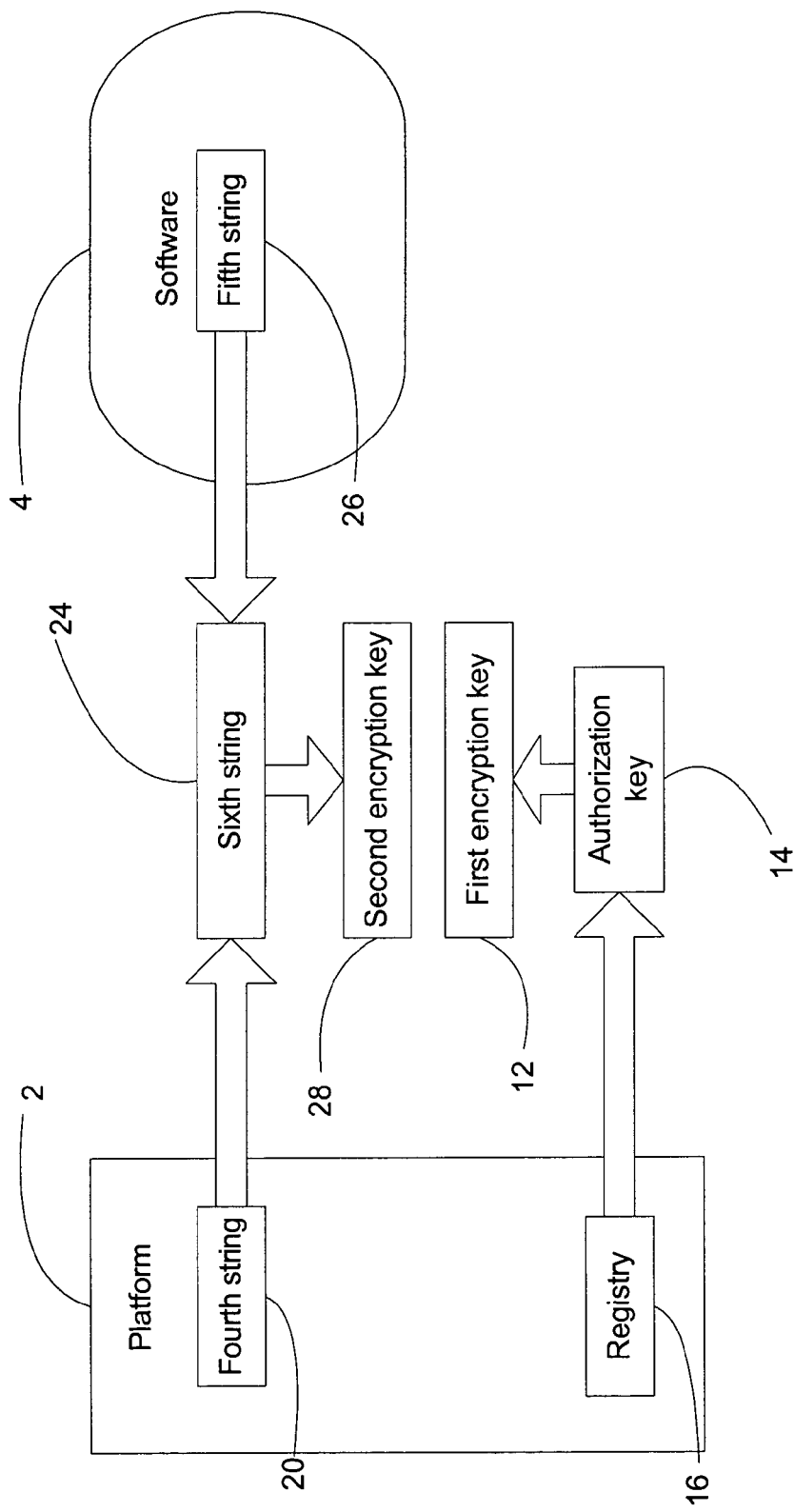
FIG. 3 shows a an exemplary system according to the present invention for verifying whether the software can be executed on a particular computing device.

FIG. 3 shows a system for authorizing the software 4 to be utilized on the platform 2. The platform 2 contains the registry 16 in which the authorization key 14 is stored after it was created using the method shown in FIGS. 2 and 4. Prior to the operation of the software 4 on the platform 2, the software 4 needs to determine if it is authorized to run on the platform 2 by using the authorization key 14.

Figure 5:
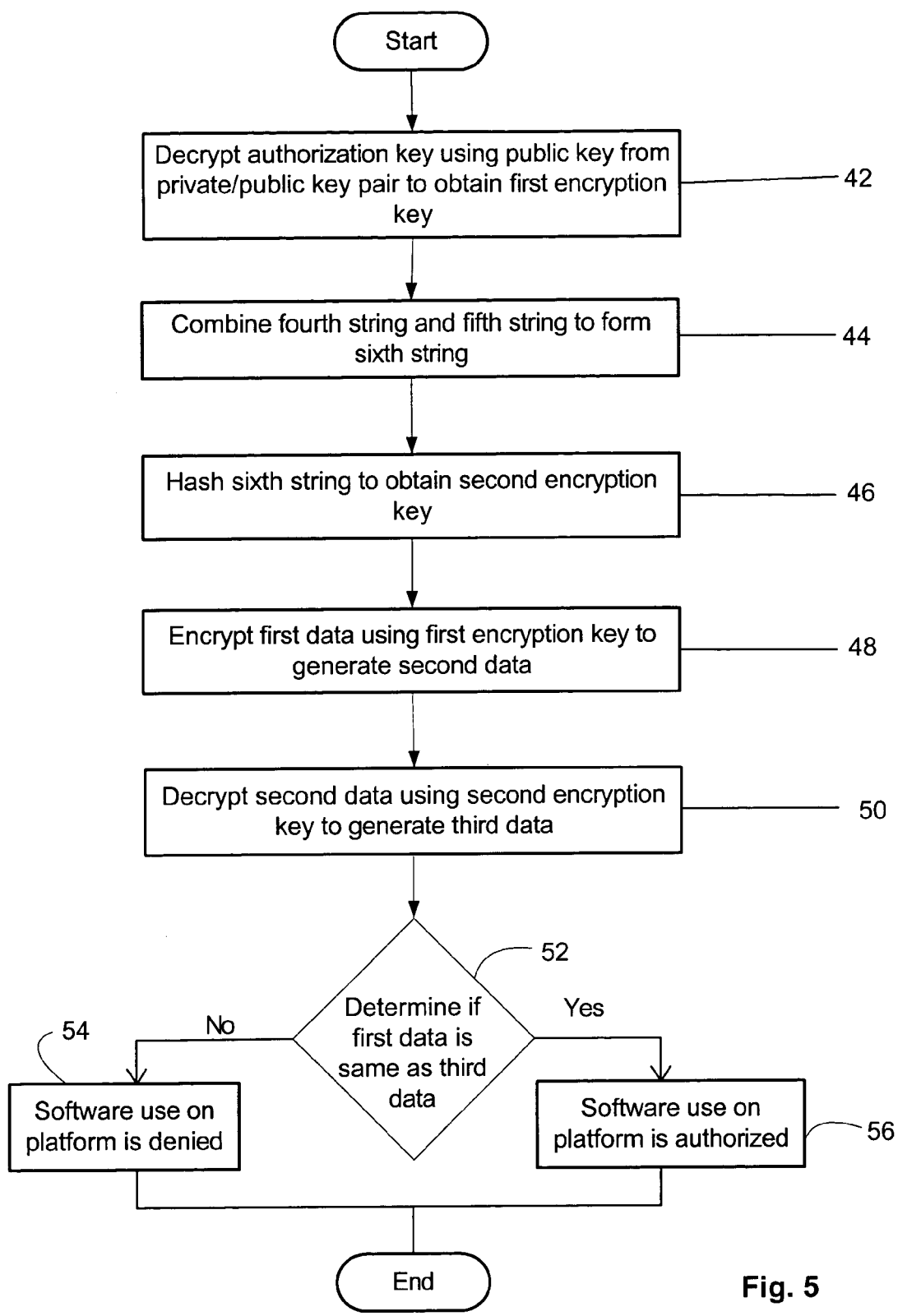
FIG. 5 shows an exemplary embodiment of a method for verifying whether the software can be executed on a particular computing device according to the present invention.

FIG. 5 shows a method for determining if the software 4 is authorized to run on the platform 2. In step 42, the authorization key 14 is extracted from the registry 16 and the authorization key 14 is decrypted in order to obtain the first encryption key 12. The decryption may be accomplished by using the public key of the same private/public key pair used in step 36 of FIG. 3. This step is similar to the decryption process of the PGP system where the public key is used to decrypt a message encrypted with a private key. If the public key used to decrypt the authorization key 14 is from the same public/private key pair as the private key used to encrypt the first encryption key 12, then the second encryption key 28 produced as a result of this decryption will be identical to the first encryption key 12.

In steps 44 and 46, the platform 2 and the software 4 create a second encryption key 28 from a fourth string 20 and a fifth string 26. The strings are located in the platform 2 and the software 4 respectively. In step 44, the fourth string 20 and the fifth string 26 are combined to form a sixth string 24. Since authorization to use the software 4 is ultimately based on a comparison of the third string 8 with the sixth string 24, it is important that the fourth string 20 and the fifth string 26 are combined in the same manner, whether by concatenation or otherwise, as the first string 6 and the second string 10 were combined to form the third string 8 in step 32. If different methods of combination are used in steps 32 and 44 the third string 8 and the sixth string 24 would never be the same and authorization to use the software would never be granted. In step 46, the sixth string 24 is hashed in order to form a second encryption key 28.

The method shown in FIG. 5 allows the software 4 to determine if it is authorized to run the platform 2 by comparing the sixth string 24 and the third string 8. If the sixth string 24 and the third string 8 are the same then the platform 2 is authorized to utilize the software 4. Therefore, to ensure that the sixth string 24 and the third string 8 are properly analyzed by the software 4, the hashing algorithm used in step 46 must be exactly the same as the one used in step 34. If the hashing functions used in steps 46 and 34 are different they would also yield a different hashing result of the sixth string 24 from that of the third string 8, even though the two strings are the same. The difference in the hashing results would in turn produce the second encryption key 28 that is different from the first encryption key 12. Since the main test of the method shown in FIG. 5 depends on the comparison of the first and second encryption keys 12 and 28, any difference between the two keys will cause a denial of authorization for the software 2, despite the fact that the software 4 should have been authorized.

Step 48–54 determine if the software 4 was in fact used in conjunction with the platform 2 to create the authorization key 14 by utilizing the first and second encryption keys 12 and 28 to analyze data. Data could be any file, code, or variable that is stored in the platform 2 or the software 4 (e.g., first string 6, second string 10, third string 8, etc.). The information that data contains is irrelevant since data provides only a sample for the encryption keys 12 and 28 to do their testing as described below. In step 48, a first data is encrypted using the first encryption key 48 to generate a second data. In step 50, the second data is decrypted using the second encryption key 12 to generate a third data.

In step 52, the software 4 compares the first data to the third data (i.e., the product of encryption and decryption of the first data). If the first and third data are the same (i.e., the encryption and the decryption processes are reversible), then the first and second encryption keys 12 and 28 are the same. Since the first and second encryption keys 12 and 28 are exactly the same, then the third string 8 and the sixth string 24 were obtained from the same sources (i.e., the platform 2 and the software 4 were in fact used to create the authorization key 14). If this is the case, then in step 56 the software 4 is authorized to run on the platform 2.

If the first and third data samples are different, however, then that denotes that the software 4 was not used in the creation of the authorization key 14. In other words, the third string 8 and the sixth string 24 are different because they are stored on different platform 2 and software 4 than the ones that were used in creating the authorization key 14. As a result, in step 54, the software 4 is prohibited from operating on the platform 2.

The present invention allows for manufacturers or software makers to insure that only certain software will run on specific platforms or computing devices. Since the authorization key is created using the strings unique to the software and the platform, copying the authorization key from one platform to another may be futile. It would discourage in copying the authorization key from one platform to another because prior to operation, the software and the platform must verify that they were in fact used to create the authorization key.

This invention is especially useful in preventing unauthorized software use in computer devices that only run one specific type of software (e.g., handheld scanners and imagers). In those devices one party usually manufactures the devices as well as provides them with the required software. Prior to this invention, it was possible for a third party to duplicate the original devices and then use the original software on that device without the permission of the original manufacturer. With the present invention, the duplicate devices would be useless to the third party. The duplicate devices would be incapable of operating the original software because they would lack the required authorization codes.

The present invention may be advantageously utilized to overcome limitations of some operating systems with limited data security capabilities. For example, some operating systems (e.g., Windows CE) do not support the public/private-key encryption of general data. However, these operating systems do support such encryption for the specific purpose of importing and exporting "session" keys. The present invention takes advantage of this limited encryption capability by combining the data to be compared into keys. These keys, formed by combining data from both the platform 2 and the software 4, can then utilize the public/private-key functionality of such operating systems. In this manner, the present invention reduces the cost of implementation by dispensing with the need to expand the security capabilities of such operating systems.

The present invention may also be advantageously utilized in other operating systems which do support public/private-key encryption of general data. The method according to the present invention adds an additional layer of obfuscation and security.

It will be apparent to those skilled in the art that the present invention allows for the platform 2 to be equipped to run the software 4 even after the software 4 has been released into the market. This may be accomplished by transmitting to the platform 2 (e.g., a Personal Digital Assistant or PDA) the string required to form an authorization key 14 when the user attempts to run the software 4 on the platform 2.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A method for controlling usage of software on a computing device, comprising the steps of:
   (a) generating an authorization key as a function of a device string and a software string, the device string being a unique string stored in the device, the software string being a unique string stored in a software authorized for use on the device;
   (b) encrypting the authorization key using a private key;
   (c) storing the authorization key in the device;
   (d) upon a request to use software on the device, performing the following substeps:
      (i) decrypting the authorization key using a public key corresponding to the private key,
      (ii) generating a test key as a function of the device string and a request software string, the request software string being a unique string stored in the software for which use has been requested, and
      (iii) comparing the decrypted authorization key to the test key; and
   (e) when the test key matches the decrypted authorization key, permitting usage of the software for which use has been requested on the device.

2. The method according to claim 1, wherein step (a) includes the following substeps:
   performing at least one of combination and concatenation of the device string and the software string to create a resulting string, and
   hashing the resulting string to generate the authorization key.

3. The method according to claim 2, wherein step (b) includes the following substeps:
   converting the authorization key into a binary large object, and
   encrypting the binary large object using the private key to generate the encrypted authorization key.

4. The method according to claim 1, wherein step (c) includes the substep of storing the authorization key into a registry of the device.

5. The method according to claim 1, wherein step (d) (iii) includes the following substeps:
   encrypting first sample data using the test key to generate second data;
   decrypting the second data using the authorization key to generate third data;
   comparing the first data to the third data; and
   when the first data is substantially identical to the third data, the test key matching to the authorization key.

6. The method according to claim 1, wherein step (d) (ii) includes the following substeps:
   performing at least one of combination and concatenation of the device string and a request software string to create a further resulting string, and
   hashing the further resulting string to generate the test key.

7. The method according to claim 1, wherein the public key is provided along with the software.

8. A computing device capable of controlling usage of software, comprising:
   a processor; and
   a memory arrangement storing a preloaded authorization key and a device string which is a unique string, the authorization key being generated as a function of the device string and a software string, the software string being a unique string stored in a software authorized for use on the device, the authorization key being encrypted using a private key,
   wherein, upon a request to use software on the device, the processor decrypts the authorization key using a public key corresponding to the private key and generates a test key as a function of the device string and a request software string, the request software string being a unique string stored in the software for which use has been requested, the processor comparing the authorization key to the test key and when the test key matches the authorization key, the processor permitting usage of the software for which use has been requested on the device.

9. The device according to claim 8, wherein the device includes a portable computing device using Windows CE operating system, and wherein the software includes Windows CE compatible software.

10. The device according to claim 8, wherein the authorization key is created by at least one of combining and concatenating of the device string and the software string to create a resulting string, the resulting string being hashed to generate the authorization key.

11. The device according to claim 10, wherein before the authorization key is stored into the memory, the authorization key is converted into a binary large object which is encrypted using the private key to generate the encrypted authorization key.

12. The device according to claim 8, wherein the processor compares the test key and the authorization key by encrypting first sample data using the test key to generate second data, the second data being decrypted using the authorization key to generate third data, the processor comparing the first data to the third data, and wherein, when the first data is substantially identical to the third data, the test key matches to the authorization key.

13. The device according to claim 8, wherein the public key is provided along with the software.

14. A computing device for controlling usage of software on a further computing device, comprising:
   a memory arrangement; and
   a processor generating an authorization key as a function of a further device string and a software string, the software string being a unique string stored in a software authorized for use on the further device, the further device string being a unique string being stored in the further device, the authorization key being encrypted using a private key,
   wherein the processor stores the authorization key and a public key corresponding to the private key, and
   wherein, upon a request to use software on the further device, the further device decrypts the authorization key using the public key and generates a test key as a function of the further device string and a request software string, the request software string being a unique string stored in the software for which use has been requested, the further device comparing the authorization key to the test key and when the test key matches the authorization key, the further device permitting usage of the software for which use has been requested.

15. The device according to claim 14, wherein the further device includes a portable computing device using Windows CE operating system, and wherein the software includes Windows CE compatible software.

16. A computer-readable storage medium storing a set of instructions, the set of instructions capable of being executed by a processor to control usage of software on a computing device, the set of instructions performing the steps of:
   (a) generating an authorization key as a function of a device string and a software string, the device string being a unique string stored in the device, the software string being a unique string stored in a software authorized for use on the device;
   (b) encrypting the authorization key using a private key;
   (c) storing the authorization key in the device;
   (d) upon a request to use software on the device, performing the following substeps:
      (i) decrypting the authorization key using a public key corresponding to the private key,
      (ii) generating a test key as a function of the device string and a request software string, the request software string being a unique string stored in the software for which use has been requested, and
      (iii) comparing the authorization key to the test key; and
   (e) when the test key matches the authorization key, permitting usage of the software for which use has been requested on the device.

* * * * *